United States Patent
Yasue

(10) Patent No.: US 7,203,724 B2
(45) Date of Patent: Apr. 10, 2007

(54) MESSAGE EXCHANGING SYSTEM AND MONITORING SYSTEM FOR CONFIRMING COMPLAINT ACCURACY

(75) Inventor: Tai Yasue, Osaka (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 711 days.

(21) Appl. No.: 10/187,375

(22) Filed: Jul. 2, 2002

(65) Prior Publication Data

US 2003/0009525 A1    Jan. 9, 2003

(30) Foreign Application Priority Data

Jul. 9, 2001    (JP) ............................. 2001-207536
Sep. 16, 2001   (JP) ............................. 2001-324218

(51) Int. Cl.
*G06F 15/16* (2006.01)
(52) U.S. Cl. ..................................... 709/203
(58) Field of Classification Search ................ 709/203
See application file for complete search history.

(56) References Cited

U.S. PATENT DOCUMENTS

| | | | |
|---|---|---|---|
| 5,668,953 A * | 9/1997 | Sloo ................................ 705/1 |
| 5,895,450 A * | 4/1999 | Sloo ................................ 705/1 |
| 5,987,503 A * | 11/1999 | Murakami ................... 709/204 |
| 6,076,100 A | 6/2000 | Cottrille et al. |
| 6,163,802 A | 12/2000 | Lin et al. |
| 6,339,591 B1 * | 1/2002 | Migimatsu ................... 370/352 |
| 6,339,784 B1 | 1/2002 | Morris et al. |
| 6,393,461 B1 | 5/2002 | Okada et al. |
| 6,535,866 B1 * | 3/2003 | Iwadate ......................... 706/61 |
| 6,625,642 B1 * | 9/2003 | Naylor et al. ................ 709/206 |
| 6,714,793 B1 * | 3/2004 | Carey et al. ................. 455/466 |
| 6,748,422 B2 * | 6/2004 | Morin et al. ................. 709/206 |
| 6,952,695 B1 * | 10/2005 | Trinks et al. ................... 707/7 |

FOREIGN PATENT DOCUMENTS

| | | |
|---|---|---|
| JP | 10-334021 | 12/1998 |
| JP | 11-249990 | 9/1999 |
| JP | 2000-513856 | 10/2000 |
| JP | 2000-330913 | 11/2000 |
| JP | 2002-108792 | 4/2002 |
| WO | 01/11852 | 2/2001 |

OTHER PUBLICATIONS

English Language Abstract of JP 2000-330913.
English Language Abstract of JP 11-249990.
English Language Abstract of JP 10-334021.
English Language Abstract of JP 2002-108792.
Howlett, D., "Screening Your E-mail Contents," PC User, London, No. 266, p. 58 (Sep. 1995).

* cited by examiner

*Primary Examiner*—David Y. Eng
(74) *Attorney, Agent, or Firm*—Greenblum & Bernstein, P.L.C.

(57) ABSTRACT

A message exchange system includes a server system, a support center and client systems. The server system distributes message information and stores a message log. The support center can confirm whether a harassment message complained about actually was sent by determining if the harassment message is in the log. Furthermore, the support center determines whether the received harassment message differs from a message log record in the server system.

11 Claims, 17 Drawing Sheets

FIG.9

WITH REGARD TO "HARASSMENT REPORT" COMMAND

WE TRY SUCH THAT ALL MEMBERS CAN ENJOY OUR SERVICE SAFELY.

THE "HARASSMENT REPORT" COMMAND CAN REPORT TO US WHEN YOU SUFFER ABUSIVE WORDS OR OBSTRUCTING ACTS CORRESPONDING TO ACTS PROHIBITED BY NOL AGREEMENT OR RESPECTIVE GUIDELINES IN USING NOL CHAT.

WHEN WE DETERMINE THAT THE NOL AGREEMENT OR RESPECTIVE GUIDELINES ARE VIOLATED, A COUNTERMEASURE MAY BE TAKEN.

FURTHER, EVEN WHEN A HARASSMENT IS REPORTED, THERE IS ALSO A CASE IN WHICH A COUNTERMEASURE IS NOT TAKEN DEPENDING ON THE ACT COMITTED.

WE DON'T INFORM A REPORTER (YOU) AS WELL AS A PERSON WHO IS OBJECT OF THE REPORT (REPORT OBJECT PERSON) WITH REGARD TO THE COUNTERMEASURE OR WHETHER THE COUNTERMEASURE IS TAKEN.

FURTHER, WE DON'T CONVEY INFORMATION OF A REPORTER (YOU) TO A REPORT OBJECT PERSON WHEN A COUNTERMEASURE IS TAKEN.

[OPEN REPORT FORM]  [DISPLAY AGREEMENT / GUIDELINE]  [RETURN]

ACTIVE HELP

ON LINE                                                                MAIL×1

HARASSMENT REPORT FORM

IN THIS FORM, YOU CAN REPORT TO CORP X A HARASSMENT (ABUSIVE WORDS OR OBSTRUCTIONS) WHICH YOU HAVE SUFFERED IN A CHAT

1. WHAT IS YOUR NOL MAIL ACCOUNT?
   THE NOL MAIL ACCOUNT IS NECESSARY FOR US TO CONFIRM YOU.

EXAMPLE : poltaro@nol.com

☐ @nol.com

1002

2. WHAT IS THE NAME USED BY THE HARASSING PERSON?
   WHEN YOU KNOW THE NAME, PLEASE INPUT THE NAME.
   WHEN A NUMBER OF CORRESPONDING PERSONS IS TWO OR MORE, PLEASE PUNCTUATE BY ",".
   EXAMPLE : poltaro, poljiro, polhanako

1003

[ NEXT ]   [ RETURN ]

[ ACTIVE HELP ]

1004

ON LINE                                        MAILX1

FIG.11

HARASSMENT REPORT FORM

3. WHAT KIND OF A HARASSMENT ACT YOU SUFFERED?

PLEASE EXPLAIN CONTENT OF A HARASSMENT SPECIFICALLY WITHIN 600 CHARACTERS.

I SUFFERED SEXUAL HARASSMENT.
I SUFFERED RACIAL DISCRIMINATION.

*WHEN INPUT IS FINISHED, PLEASE PUSH "NEXT".

RETURN    NEXT

ACTIVE HELP

ON LINE    MAILX1

MESSAGE EXCHANGING SYSTEM AND MONITORING SYSTEM FOR CONFIRMING COMPLAINT ACCURACY

CROSS REFERENCE TO RELATED APPLICATION

The present disclosure relates to subject matter contained in Japanese Patent Application No. 2001-207536, filed on Jul. 9, 2001, and Japanese Patent Application No. 2001-324218, filed on Sep. 16, 2001, the disclosures of which are expressly incorporated herein by reference in their entireties.

BACKGROUND OF THE INVENTION

1. Field of the Invention

The present invention relates to a message exchanging system, a monitoring system, a server system, a message exchanging method, a message monitoring method and a recording medium. More particularly, the present invention relates to multiple people exchanging messages on a communications network.

2. Description of the Related Art

Conventionally, a network communication tool and a system thereof have been used by users of client machines connected to a communications network, such as the Internet, to exchange messages in real time.

There is a tool for two people to exchange messages in real time on the Internet by unicast (one-to-one communication). For example, as in ICQ (trade mark of Milabilis Corp. of Israel), there is a tool for exchanging messages between two people in a multiwindow environment by displaying screens for sending messages and receiving messages on the client machines.

Furthermore, there are also a tool and a system for multiple people to exchange messages, or carrying out so called chat in real time on the Internet by multicast (communication from one person to multiple people in a specific group). Such a system is generally referred to as IRC (Internet Relay Chat) in which a message sent to a chat room installed by a server machine is received by a client machine and is displayed as a message log on a screen for chat.

Conventionally, the person who receives a troubling (e.g. harassing) message when exchanging messages during the chat files a complaint about the troubling message to an operating party which operates the message exchanging system. However, when making the complaint, time and labor is taken. Furthermore, for the operating party, it is difficult to confirm whether the harassment described in the complaint was actually carried out. It is also difficult to determine a sender of the message.

Hence, the invention has been made in view of the situation and it is an object thereof to easily and pertinently determine the truth of the presence of a message.

SUMMARY OF THE INVENTION

In order to achieve the object, according to a first embodiment of the invention, there is provided a message exchanging system, first client systems, a server system and a second client system. The first client systems may be connected to the server system and execute a message exchange via the server system. The server system may distribute message information generated by adding at least sender information to a message to be exchanged, and stores a log of the distributed message information. The second client system may be connected to the server system and monitors the message exchange. The first client system includes a designating system that designates a particular message and the sender information of the particular message from one or more pieces of the distributed message information. The first client system further includes a sending system that sends the particular message and the sender information of the particular message to the second client system. The second client system includes a receiver that receives the particular message and the sender information of the particular message sent from the sending system, and a determining system that determines whether the particular message received by the receiver is present in the log.

According to a second embodiment of the invention, there is provided a monitoring system for monitoring an exchange of a message by client systems via a server system. In the message exchange, message information generated by adding at least sender information to the message may be utilized. The server system stores a log of the message information. The monitoring system includes a receiver that receives, from the client system, particular message information designated from the message information distributed to the client system. The monitoring system further includes a determining system that determines whether the message information received by the receiving system is present in the log stored by the server system.

The monitoring system may also include a display that displays the particular message and the sender information of the particular message received by the receiver when the determining system determines that the particular message is present in the log. Furthermore, time information may be provided to correspond to the message information. The determining system determines whether the particular message is present in the log by searching for the particular message in the log using the sender information and the time information as keys.

According to a third embodiment of the invention, there is provided a server system which distributes message information generated by adding at least sender information to a message to be sent among a group of client systems connected via a network and stores a log of the message information. The server system may include a receiver that receives, from the client system, particular message information designated from the message information distributed to the client system. The server system may also include a determining system that determines whether the message information received by the receiver is present in the log.

According to a fourth embodiment of the invention, there is provided a message exchanging method executed by a message exchanging system. The message exchange system may include first client systems, a server system, and a second client system. Each first client system may be connected to the server system and execute a message exchange via the server system. The server system may distribute message information generated by adding at least sender information to a message to be exchanged and store a log of the distributed message information. The second client system may be connected to the server system and monitor a status of the message exchange. The message exchange method includes designating, by the first client system, a particular message and sender information of the particular message from one or more pieces of the message information distributed from the server system. The message exchange method also includes sending the particular message and the sender information of the particular message designated by the first client system to the second client system. The method further includes receiving the particular message and the sender information of the particular message sent by the second client system, and determining, by the second client system, whether the received particular message is present in the log.

According to a fifth embodiment of the invention, there is provided a message monitoring method for monitoring an exchange of a message by client systems via a server system. In exchanging the message, message information generated by adding at least sender information to the message is utilized. The server system stores a log of the message information. The message monitoring method includes receiving, from the client system, particular message information designated from the message information distributed to the client system, and determining whether the received message information is present in the log stored by the server system.

The message monitoring method may also include displaying the received particular message and the sender information of the particular message when it is determined that the particular message is present in the log. Time information may be provided to correspond to the message information. Furthermore, it is determined whether the particular message is present in the log by searching for the particular message in the log using the sender information and the time information as keys.

According to a sixth embodiment of the invention, there is provided a message monitoring method executed by a server system. The server system distributes message information generated by adding at least sender information to a message to be sent among client systems connected via a network and stores a log of the message information. The message monitoring method includes, from the client system, receiving particular message information designated from the message information distributed to the client system. The method also includes determining whether the received message information is present in the log.

According to a seventh embodiment of the invention, there is provided a recording medium on which is recorded a program executed by a computer. The program causes the computer to monitor an exchange of a message by client systems via a server system. In exchanging the message, message information generated by adding at least sender information to a message is utilized, and the server system stores a log of the message information. The program includes a receiving procedure that receives, from the client system, message information designated from the message information distributed to the client system, and a determining procedure that determines whether the message information received by the receiving procedure is present in the log stored by the server system.

BRIEF DESCRIPTION OF THE DRAWINGS

FIG. 9 is an explanatory view of a report command screen of harassment according to an embodiment of the invention;

FIG. 10 is an explanatory view of a report form screen of harassment according to an embodiment of the invention;

FIG. 11 is an explanatory view of an explanation input screen according to an embodiment of the invention;

DETAILED DESCRIPTION OF THE PREFERRED EMBODIMENTS

Figure 1:
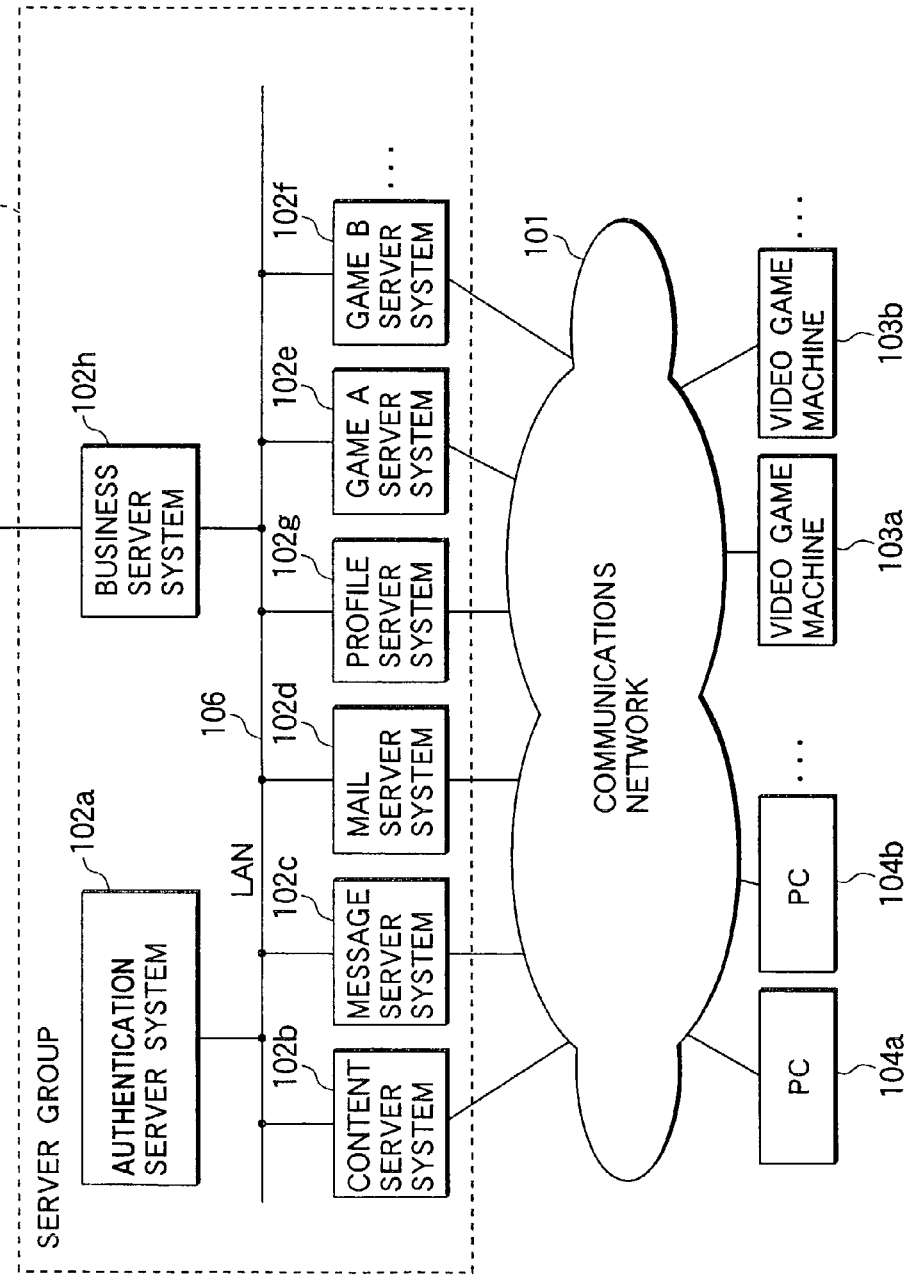
FIG. 1 is a block diagram of a communications network service system according to an embodiment of the invention.

Preferred embodiments of the invention will be explained in detail with reference to the appended drawings. Portions having the same functions in the respective drawings are designated with the same reference numerals and a duplicative explanation will be omitted.

A message exchanging system according to the present embodiment will be explained as one function in a communications network service system provided by a network service company (hereafter, corporation X). The communications network service system of this embodiment provides a communications network service, operated by a group of servers installed by the network service company, to member users via the network. Furthermore, a title of the communications network service of the embodiment is referred to as NOL (New On-Line).

Content provided in the communications network service includes, for example, a content viewing service; various sports, music, comics, and shopping information and the like, and a communications service therefor. A message exchange environment may also be included for real time messaging among users (constituting a message exchange system according to the embodiment) as can a mail service environment and a game service. The content may also include an online game environment started via a communications network and the like.

A member user of the communications network service starts a viewer (software for displaying data) on a client machine. The viewer may be used exclusively for the communications network service. Subsequently, the user access a group of servers of the network service company and utilizes services.

A customer support center of the communications network service starts a software tool for handling a report of a harassing message received when exchanging messages according to the embodiment on a client system. Then, the customer support center accesses the group of servers of the network service company and monitors a situation of the message exchanging system.

(System Constitution)

FIG. 1 is a system diagram of the communications network service system according to the embodiment. The communications network service system includes a communications network 101, a server group 102 of the network service company and first client systems, such as client systems 103a, 103b, 104a, 104b and the like. The first client systems are connected to the server group 102 via the communications network 101 and are used by multiple users. Furthermore, the communications network service system includes a client system 105 serving as a second client system and a monitoring system. The client system 105 is connected to the server group 102 via a private line and used by an operator of a customer support center. The server group 102 and the client systems 103a, 103b, 104a, 104b and 105 are respectively computer systems.

The client systems 103a and 103b are video game machines for household use. The client systems 104a and 104b are personal computers (hereinafter, referred to as PCs). The PC is assumed to operate in an OS (operating system) environment of, for example, Windows (registered trademark) 98 of Microsoft Corp. or the like. Such a system constitution of a PC is well known and therefore, a particular detailed explanation thereof will be omitted. The client systems 103a and 103b can start viewer programs by loading the programs from CD-ROM to memories. Each of the client systems 104a and 104b is mounted in advance with the viewer at built-in HD (hard disk).

The communications network 101 connects the server group 102 and the client systems 103a, 103b, 104a, 104b and the like. The Internet may be the communications network 101 in this embodiment.

The server group 102 accesses stored data and processes the data and carries out services for the respective client systems in response to requests from the client systems. The server group 102 includes an authentication server system 102a, a content server system 102b, a message server system 102c, a mail server system 102d, a game A server system 102e, a game B server system 102f, a profile server system 102g and a business server system 102h. The server systems are connected via LAN (local area network) 106.

The authentication server system 102a manages a user account (user ID (identifier)), a password, a mail account and the like of the member users. Furthermore, the authentication server system 102a may manage a connection status (online/off-line) of a user and an address of a client machine of an on-line user.

The content server system 102b provides various kinds of information, such as sports information, music, comics, shopping information, etc.

The message server system 102c provides an environment for exchanging real-time messages among users. More specifically, the message server system 102c provides an environment for a messenger application and a chat application started on client machines by users. The message server system 102c mainly carries out routing (setting of a sending destination, route) for distributing exchange messages of the messenger application and chat messages of the chat application.

The mail server system 102d provides an environment for exchanging electronic mails among users.

The game A server system 102e is a server system for a game whose title is "A" and the game B server system 102f is a server system for a game whose title is "B" (the respective server systems are constituent elements of an on-line game system of the embodiment). The server system of each game provides the on-line game environment. The user plays the game by starting the on-line game in the game server system from the viewer. For example, when the on-line game is a role-playing game, the role-playing game can be played along with other member users.

The profile server system 102g manages each user account with respect to a profile of the user corresponding to the user account. The user may register his profile to the profile server system from the viewer.

Furthermore, the profile server system 102g manages one or more handle names (hereinafter, HN) in correspondence with the user account for the respective user account. The HN designates an assumed name of the user and the user participates in a game or sends a message under the HN. When the user participates in, for example, chat, the user chats under a desired HN. The handle name HN is registered in advance in the profile server system 102g in correspondence with the user account. When a user participate in chat, a list of the handle names may be acquired from the profile server system 102g and displayed, and a desired handle name may be selected from the list.

The business server system 102h carries out business processing of the communications network service, such as service charges of the communications network, management of personal information (enrollment, withdrawal or the like), customer support, and the like, of the user (according to the embodiment) in correspondence with the respective user account. The business server system 102h receives and processes a request from the client system 105 of the customer support center.

The client system 105 may be a PC and is preloaded (in the HD) with a software tool for processing a report of a harassing message (hereinafter, harassment report processing tool) in exchanging messages according to the embodiment and well-known mailer. The client system 105 starts the harassment report processing tool, the mailer or the like by loading the tool to a memory and receives a report of a harassing message sent from the client system of the user via the business server system 102h. In addition, the client system 105 accesses the business server system 102h via the private line by the harassment report processing tool to acquire log information with regard to the message exchange from the server group 102. Thus, the client system 105 processes the harassment message and monitors the status of the message exchanging system (a detail thereof will be given later).

In sending and receiving data of the communications network 101, the private line and LAN 106 or the like, there may be used standard protocols, such as TCP/IP (transmission control protocol/internet protocol), HTTP (hypertext transfer protocol), SMTP (simple mail transfer protocol), FTP (file transfer protocol) and the like.

Furthermore, each server system can use CGI (common gateway interface), SSI (server side include), DBMS (database management system) or other well-known techniques in order to execute database processing and other back-end programs in response to various requests from each client system.

(Client System)

An explanation will be given of a case in which the client system is constituted by a video game machine for household use.

Figure 2:
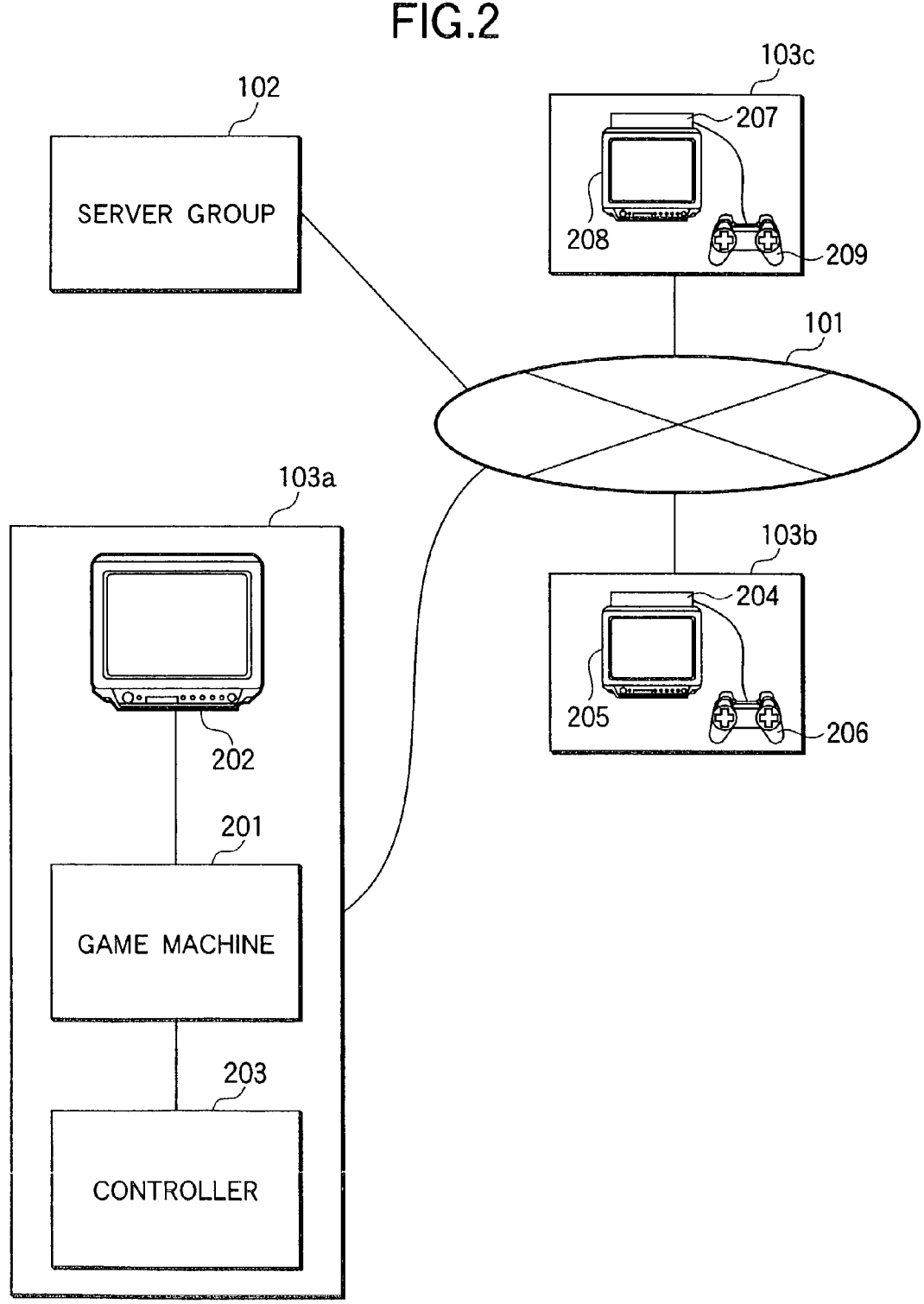
FIG. 2 is an explanatory view of an environment for using a video game machine for household use according to an embodiment of the invention.

FIG. 2 explains an environment for using the client systems 103a, 103b and 103c (not shown in Fig.1) which may be video game machines for household use. The client systems 103a, 103b, 103c are connected to the server group 102 via the communications network 101.

The client system 103a includes a game machine main body 201, a television receiver 202 and a controller 203. Similarly, the client system 103b includes a game machine main body 204, a television receiver 205 and a controller 206 and the client system 103c includes a game machine main body 207, a television receiver 208 and a controller 209.

The game machine main body 201 starts the viewer and accesses the server group 102. The television receiver 202 outputs image and sound data from the game machine main body 201. The controller 203 inputs instruction of the user to the game machine main body 201.

In an example, a user Yasue accesses the server group 102 by using the client system 103a and a user Takeshi accesses the server group 102 by using the client system 103b.

Next, an explanation will be given of system components of the game machine main body. The game machine main bodies 201, 204 and 207 are constructed similarly and therefore, an explanation will be given here by taking an example of the game machine main body 201.

Figure 3:
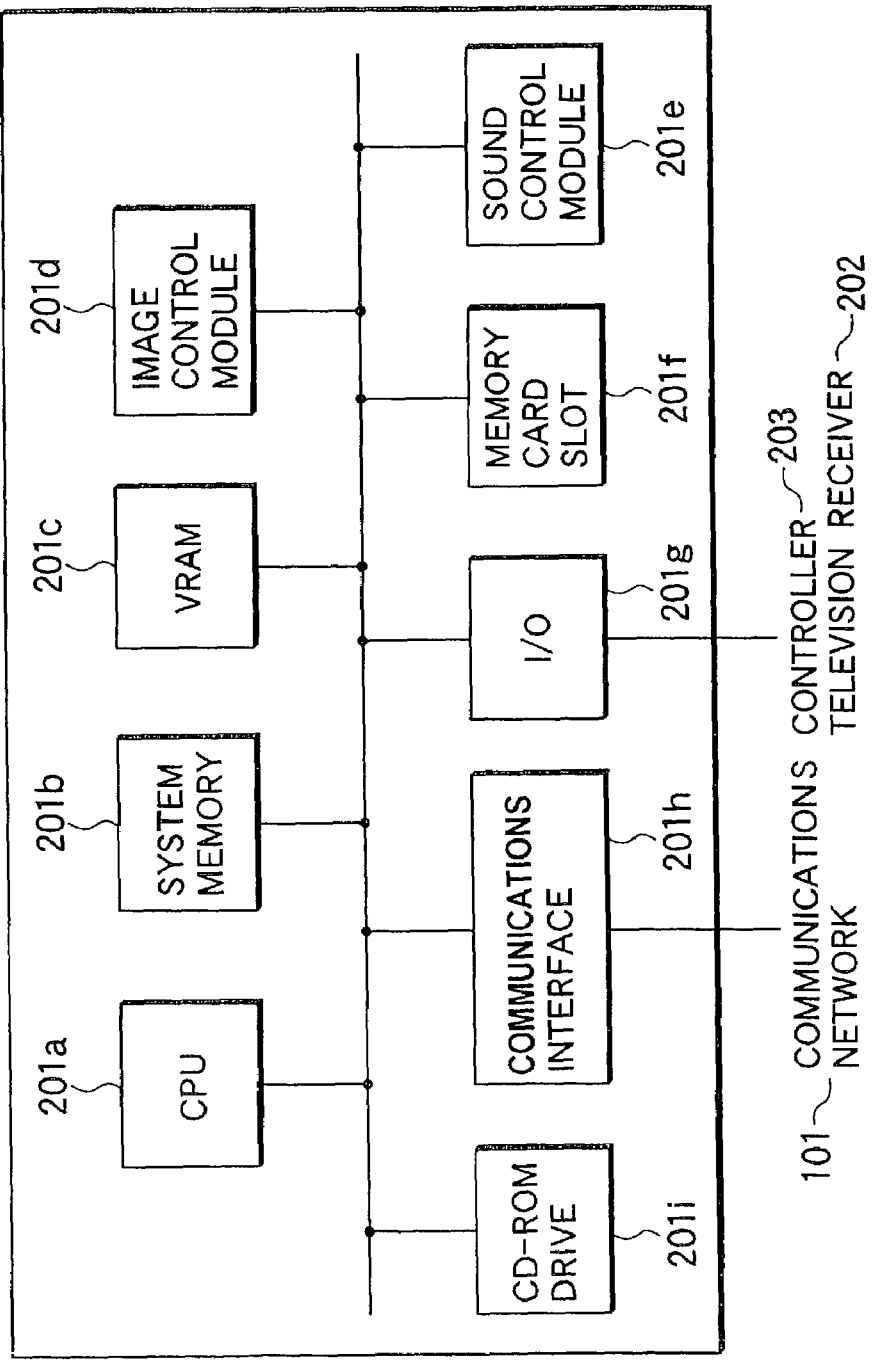
FIG. 3 is a block diagram of a game machine main body according to an embodiment of the invention.

FIG. 3 shows the system components of the game machine main body 201. In FIG. 3, the game machine main body 201 includes CPU (central processing unit) 201a, a system memory 201b, VRAM (video ram) 201c, an image control module 201d, a sound control module 201e, a memory card slot 201f, an I/O (input/output) interface 201g, a communication interface 201h and a CD-ROM drive 201i.

CPU 201a controls all components of the game machine main body 201 in accordance with the control procedure of a program loaded or stored to the system memory 201b. The system memory 201b includes ROM (read only memory), RAM (random access memory), etc. The ROM stores a BIOS (basic input/output system) program and the RAM temporarily stores control data and a viewer program loaded from CD-ROM of the CD-ROM drive 201i.

VRAM 201c develops and temporarily stores image data to be displayed on the television receiver 202. The image control module 201d controls the image data to be displayed on the television receiver 202. The sound control module 201e controls sound data to be output from the television receiver 202.

The memory card slot 201f is an interface for inserting a memory card stored with data, to which CPU 201a refers when starting the viewer.

The I/O interface 201g inputs and outputs data between external devices, such as the television receiver 202 or the controller 203, and the game machine main body 201. The communications interface 201h carries out communication control with the communications network 101.

The CD-ROM drive 201i drives CD-ROM stored with a program and reads the program. According to the embodiment, the CD-ROM stored with the viewer program is read by the CD-ROM drive 201i and the viewer program is loaded into RAM of the system memory 201b.

Figure 4:
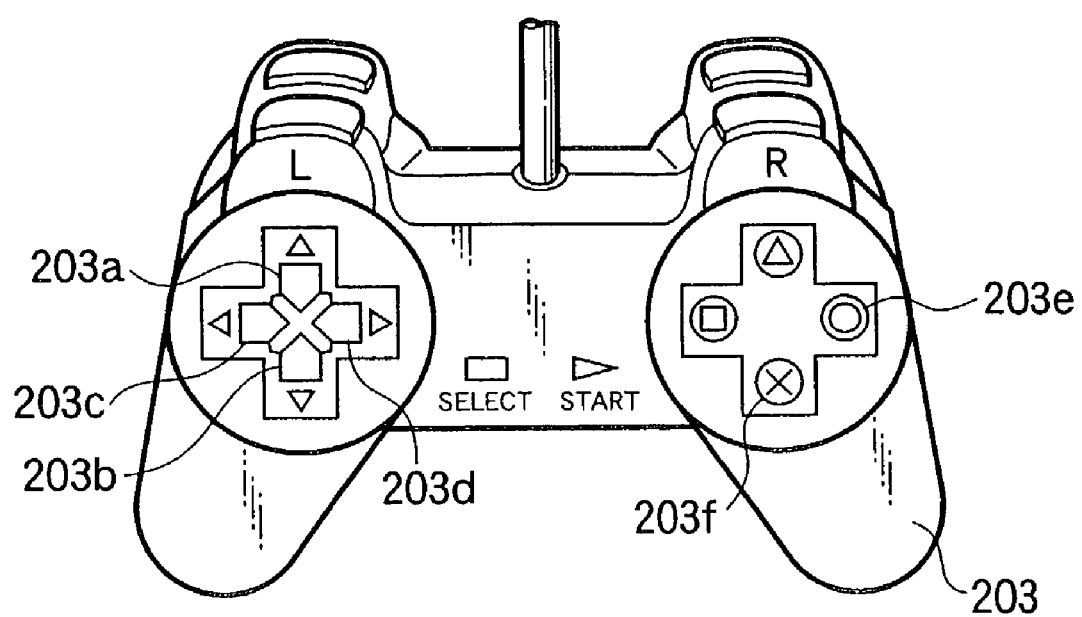
FIG. 4 is an explanatory view of a controller according to an embodiment of the invention.

FIG. 4 shows an embodiment of the controller 203. Components of the controllers 206 and 209 are similar to that of the controller 203 and therefore, an explanation thereof will be omitted. Reference numerals 203a, 203b, 203c, and 203d respectively designate up, down, left, and right direction keys. Reference numeral 203e designates a circle button and 203f designates a cross button. A user gives instruction to the game machine main body 201 by pushing the keys and the buttons.

The direction keys 203a, 203b, 203c, and 203d move a cursor (highlight) for designating an item on a screen of the viewer displayed on, for example, the television receiver 202 and an indicator (arrow mark) moved in conjunction with the cursor while pointing the cursor in a corresponding direction.

The circle button 203e is a button by which the cursor is operated to select a certain item. The cross button 203f is a button for canceling the selecting operation or returning to an immediately previous operational step.

(Message Exchange and Harassment Report)

An explanation will be given (with reference to FIG. 5 through FIG. 13) of a case in which in exchanging messages according to the embodiment, user Yasue uses the client system 103a and receives a harassing message from user Takeshi using the client system 103b and therefore, user Yasue sends a harassment report mail reporting the harassment message to the customer support center. The client system 105 of the customer support center, which receives the mail, handles the harassment report.

When user Yasue loads a CD-ROM stored with a viewer program in the game machine main body 201, the game machine main body 201 starts the viewer.

An initial screen of the viewer requests a user to input a user account and/or the password for logging-in. In response, the user inputs his user account and the password from a software keyboard, not illustrated, (a keyboard is displayed on a screen), or from an externally attached keyboard, not illustrated. Then, the user carries out the selecting operation using the circle button 203e to log-in.

The viewer, according to one embodiment, can use a total of four master accounts and three sub accounts as accounts for logging-in. The accounts are stored in the memory card inserted into the memory card slot 201f in association with the password, and the accounts and the password are checked with the accounts and the password input during log in. The user Yasue is assumed to be logged in under his master account "yasue".

Figure 5:
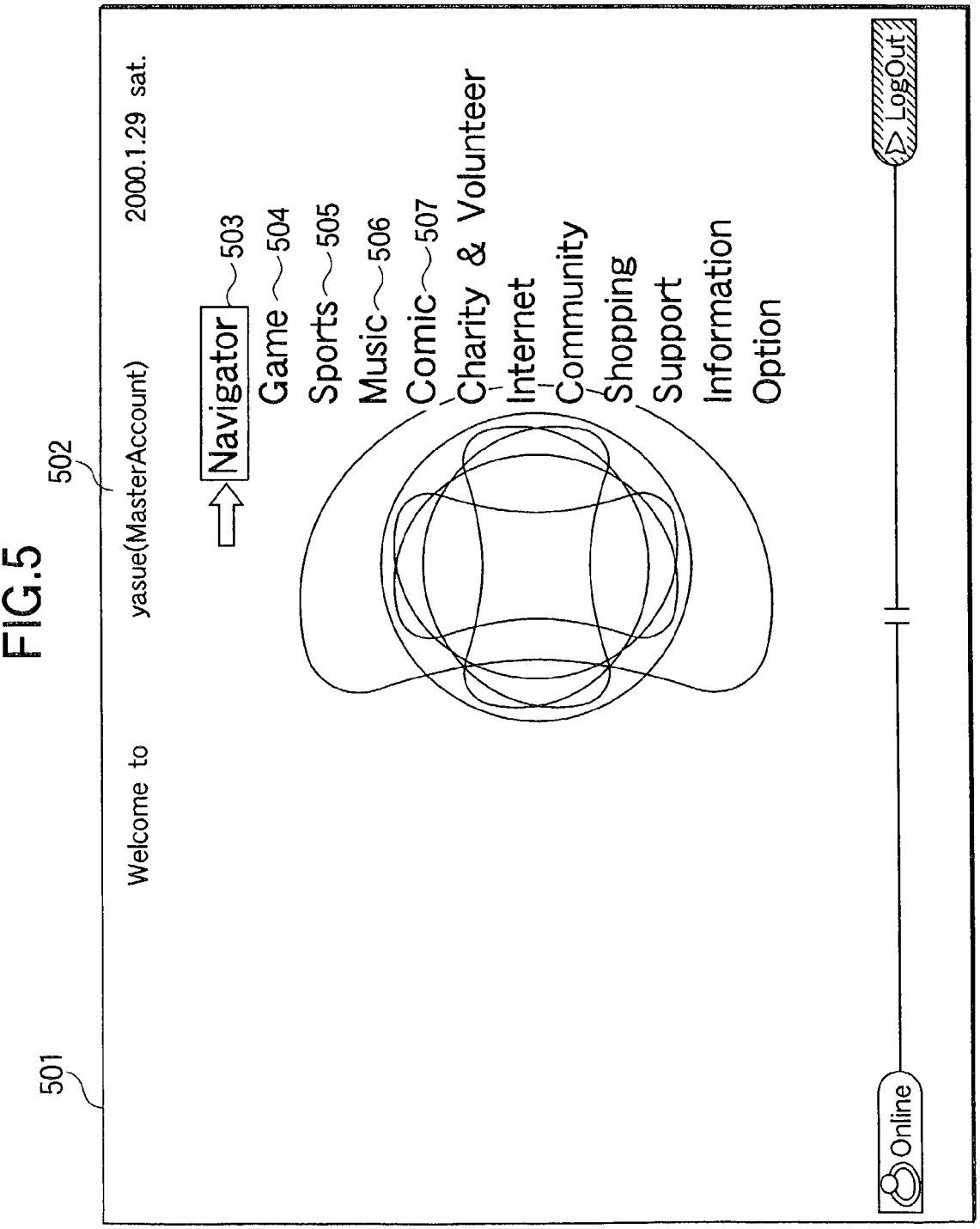
FIG. 5 is an explanatory view of a first screen of a viewer according to an embodiment of the invention.

FIG. 5 shows a screen of the viewer immediately after log in, in this example. In FIG. 5, a viewer menu screen 501 includes a user account 502, a navigator command button 503, a game command button 504, a sports command button 505, a music command button 506, a comics command button 507 and the like. At this point in time, the viewer is off-line from the server group 102.

A user moves the cursor to a desired button (indicator is also moved in sync therewith) and carries out the selecting operation with the circle button 203e to start a function related to a selected button. In this way, the user can carry out the selecting operation for a certain item with the cursor and start a function related to the item.

When the user moves the cursor to the game command button 504 and carries out the selecting operation, a game tool for carrying out a game by accessing the profile server system 102g, the game A server system 102e, the game B server system 102f, etc., is started.

When the user carries out the selecting operation for the sports command button 505, the music command button 506, the comics command button 507 or the like, access is made to the content server system 102b and a content viewing tool is started for acquiring the various content information.

When the user selects the navigator command button 503, there is started a communications tool "navigator" for providing communications services by accessing the message server system 102c, the mail server system 102d and the profile server system 102g. The navigator is a communications tool integrated with messaging applications (hereinafter, simply referred to as a messenger), chat applications, mail applications and the like.

An explanation will be given of starting the navigator. When the navigator is started, the authentication server system 102a authenticates access to server group 102 with the user account and the password which was required for logging into the viewer, and the viewer is brought into a state of being on-line with the server group 102.

Figure 6:
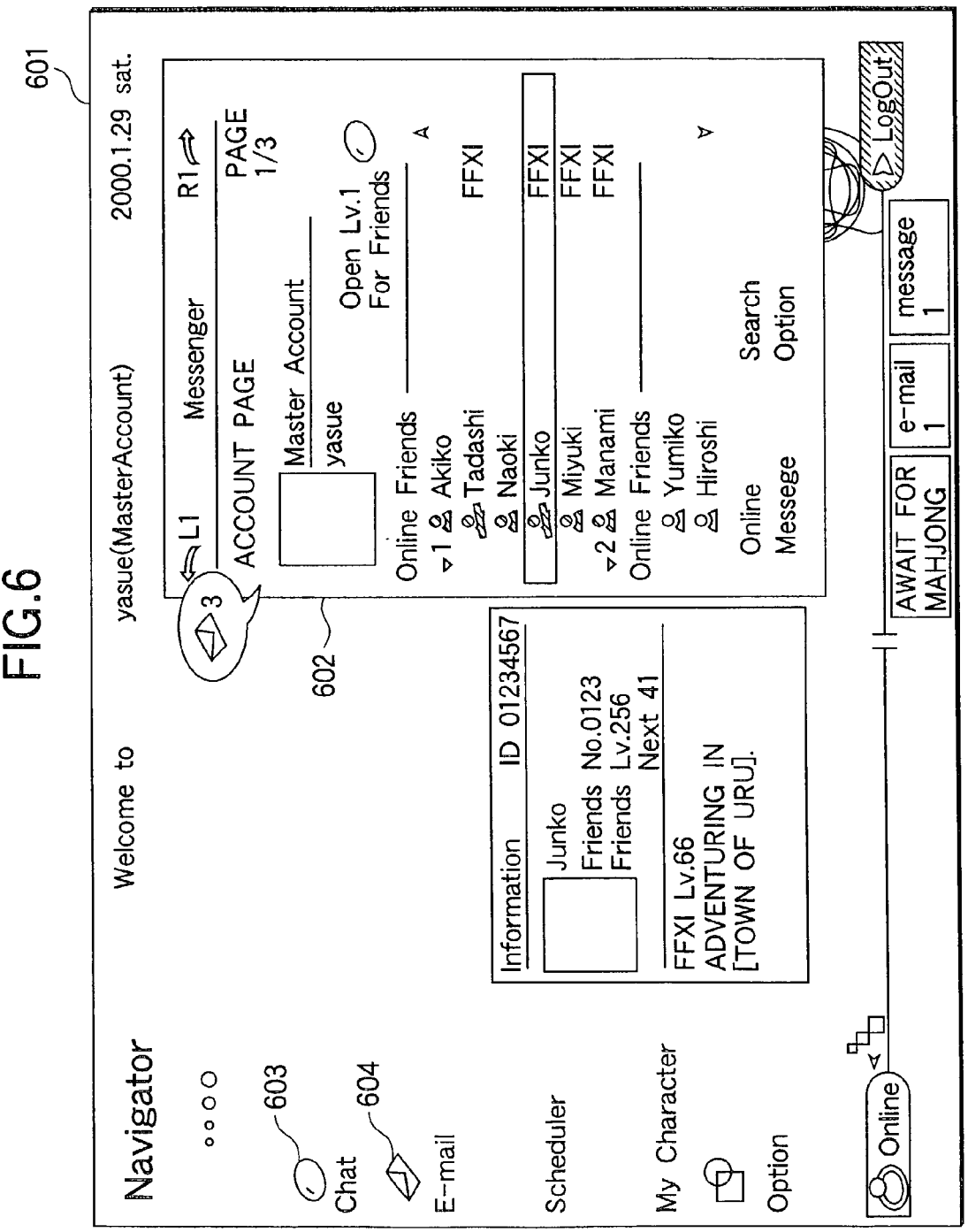
FIG. 6 is an explanatory view of a first navigator screen according to an embodiment of the invention.

FIG. 6 shows a screen of the viewer when the navigator command button 503 is selected and the navigator is started. In FIG. 6, the navigator first screen 601 includes a main window 602 of the messenger, a chat command button 603, a mail command button 604 and the like.

Immediately after starting the navigator, the messenger is automatically started, the viewer is brought into an online state with the message server system 102c and the main window 602 of the messenger is displayed. The messenger is a communications tool for accessing the message server system 102c, monitoring a status of member users connected to the server group 102 and exchanging messages in real time between two on-line users.

When a user operates to determine the mail command button 604, a mail application is stored for accessing the mail server system 102d and exchanging electronic mails.

Figure 7:
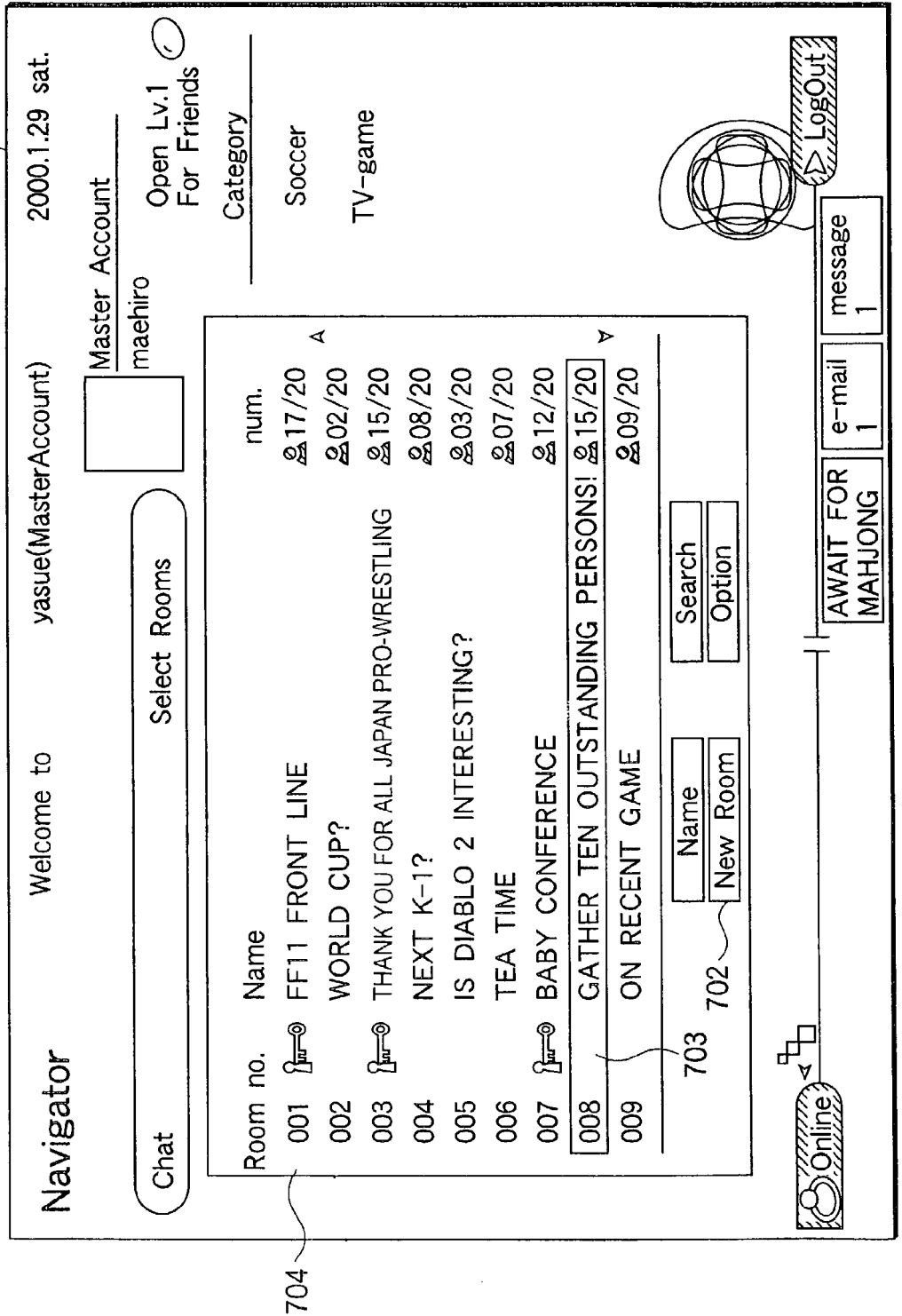
FIG. 7 is an explanatory view of a screen for selecting a chat room according to an embodiment of the invention.

When user Yasue selects the chat command button 603, a chat application is started for accessing the message server system 102c and carrying out a chat. FIG. 7 shows the screen of the viewer in this case.

FIG. 7 is a chat-room selecting screen 701. The user carries out the selection operation by moving the cursor to a selected chat room 703 of Room no. 008 to enter the chat room 703. Furthermore, when a chat room is newly created, the user selects a button 702 for creating a chat room and carries out a predetermined procedure for creating a new chat room in the message server system 102c.

Figure 8:
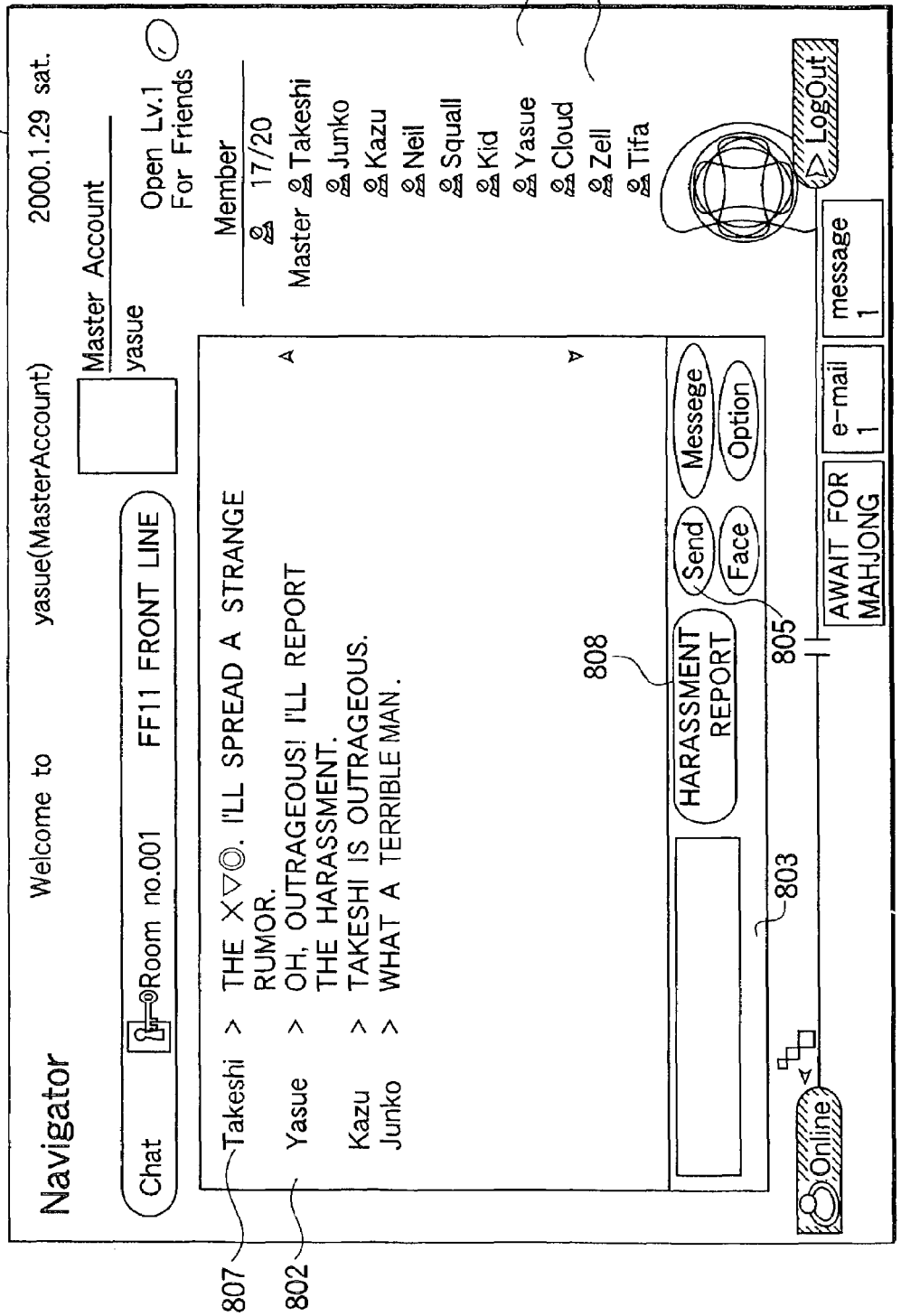
FIG. 8 is an explanatory view of a chat screen according to an embodiment of the invention.

FIG. 8 shows a screen of the viewer when user Yasue selects a chat room 704 of Room no. 001 in the screen 701 for selecting the chat room of FIG. 7. In FIG. 8, the chat screen 801 includes a chat window 802, a message input window 803, a participating member table 804 and the like.

The message server system 102c controls participating member table data of the created chat room and a message log time-sequentially holding a message sent to the chat room and a self-controlled message generated by the system. When a message is sent to the established chat room (or a self-control message is generated), the message server system 102c adds the message to the message log. Then, the message server system 102c multicasts chat room data, including the newest lines of the message log and the participating member table data, to the users present in the participating member table data.

The client system 103a displays a message log (maximum 64 lines in one embodiment) of the received chat room data on the chat window 802 and displays the participating member table data of the received chat room data on the participating member table 804. The participating member table 804 displays HNs of the members participating in the chat room and a status thereof (status of entering and leaving the room or the like). In this embodiment, for convenience, the user account of the member is designated by HN for simplicity.

A detailed explanation will be given of the chat according to the present embodiment. User Yasue selects and enters the chat room 704 of Room no. 001 in the screen 701 by selecting the chat room of FIG. 7. Then, the message server system 102c multicasts chat room data including a message log added with a self-controlled message stating that Yasue enters the room and the participating member table data added with Yasue under HN of Yasue to users of HN present in the participating member table data.

When user Yasue receives the chat room data, as shown by FIG. 8, HN 806 of Yasue is displayed on the participating member table 804 along with other HN. Furthermore, a message log of received chat room data is displayed in the chat window 802. A participating member table similar to the participating member table 804 is displayed on a chat screen of other user participating in the chat room no. 001.

Thereafter, Yasue inputs a message by moving the cursor to the message input window 803 and sends the message to the chat room no. 001 of the message server system 102c by selecting a sending command button 805.

In this case, the message server system 102c multicasts chat room data including a message log showing the message of Yasue and the participating member table data having HN Yasue, to users of HNs present in the participating member table data.

The client systems of the users participating in the chat, including Yasue, display the message log of the received chat room data in the chat window and display the participating member table data of the received chat room data to the participating member table.

Similarly, when the user inputs a message to the message input window and sends the message by selecting the send command button, the client systems of the users participating in the chat, including Yasue, display the message log of the received chat room data on the chat window and display the participating member table data of the received chat room data on the participating member table.

By repeating the procedure, the message log of the chat window 802 is displayed while being updated to thereby carry out the chat.

Here, suppose that user Yasue receives a harassing message from Takeshi. Reference numeral 807 in FIG. 8 designates a harassment message from Takeshi. An explanation will be given of a procedure in which user Yasue generates a harassment report with regard to the harassment message 807 and sends the report to the customer support center.

When user Yasue moves the cursor to a harassment report command button 808 and selects it, a harassment report function of the viewer starts and in place of the chat screen 801, a harassment report command screen is displayed on the viewer.

FIG. 9 shows the harassment report command screen 901. The harassment report command screen 901 includes a harassment report command explanation window 902, a report form command button 903 and the like in FIG. 9.

When user Yasue moves the cursor to the report form command button 903 and selects it, a harassment report form screen is displayed on the viewer.

FIG. 10 shows the harassment report form screen 1001. In FIG. 10, the harassment report form screen 1001 includes a mail account input column 1002, a harassment suspect name input column 1003, a "next" command button 1004 and the like.

User Yasue moves the cursor to the mail account input column 1002 and inputs his mail account. Furthermore, user Yasue moves the cursor to the harassment suspect name input column 1003 and inputs the HN of a sender of the harassment message as the name of a suspect making the harassment. In this case, there is input HN "Takeshi". Furthermore, when Yasue moves the cursor to the "next" command button 1004 and selects it, the viewer displays an explanation input screen constituting a successive screen of the harassment report form.

FIG. 11 shows the explanation input screen 1101. In FIG. 11, the explanation input screen 1101 includes an explanation input window 1102, a "next" command button 1103 and the like.

User Yasue moves the cursor to the explanation input window 1102 and inputs an explanation of the content of the harassment message. Furthermore, when user Yasue moves the cursor to the "next" command button 1103 and selects it, the viewer displays a harassment message selecting screen constituting a successive screen of the harassment report form.

Figure 12:
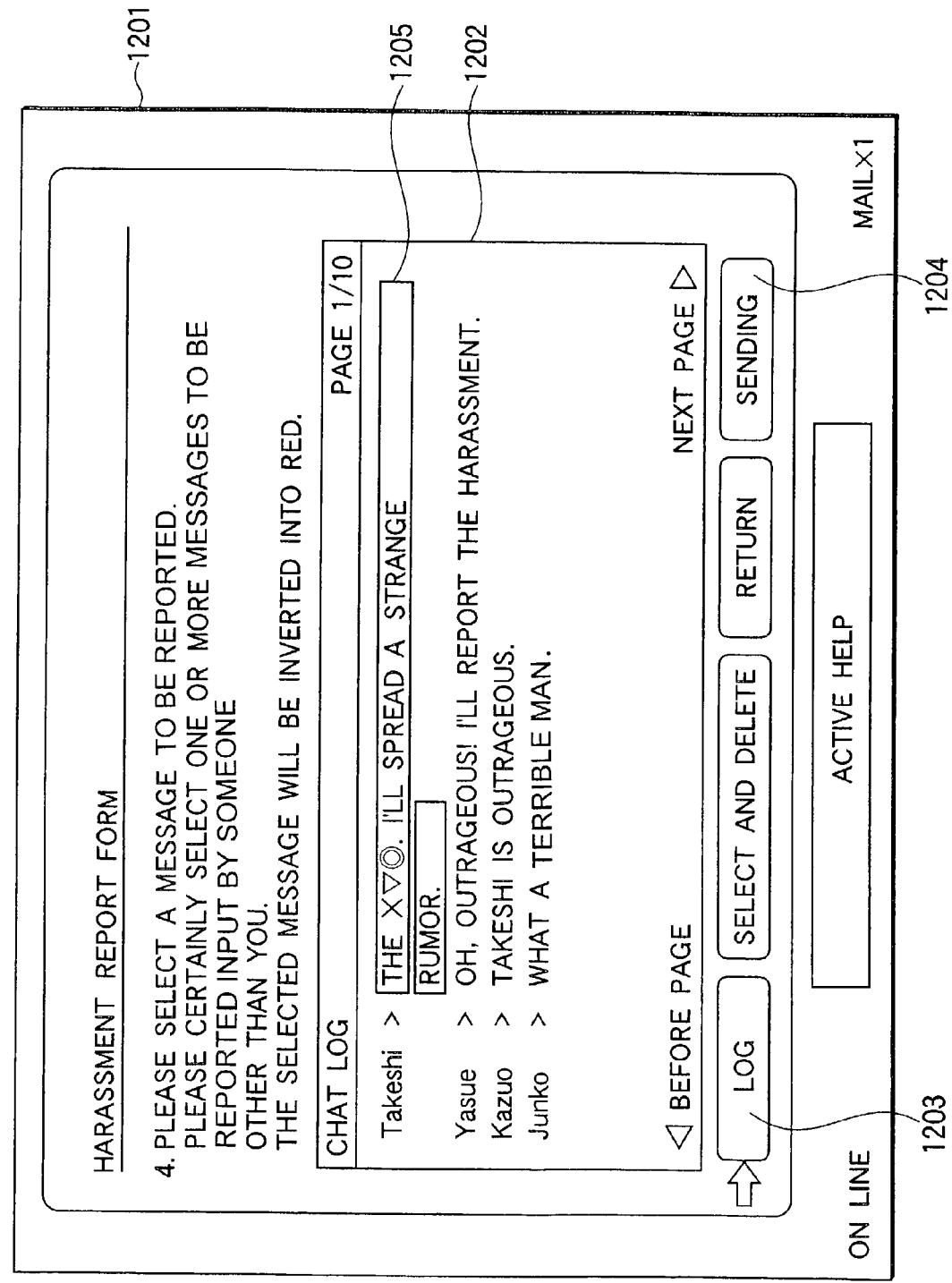
FIG. 12 is an explanatory view of a screen for selecting a harassment message according to an embodiment of the invention.

FIG. 12 shows the harassment message selecting screen 1201. In FIG. 12, the harassment message selecting screen 1201 includes a message log window 1202, a log command button 1203, a sending command button 1204 and the like.

Here, the harassment message 807 is displayed in the message log of the chat window 802. In order to report the harassment message 807, the message log of the chat window 802 at a point in time of switching from the chat screen 801 to the harassment report command screen 901, is imported and displayed on the message log window 1202.

When user Yasue moves the cursor to the log command button 1203 and selects it, the cursor is moved to a message at an uppermost stage in the message log window 1202. Subsequently, when user Yasue moves the cursor to the harassment message and selects it, the harassment message is highlighted in red and becomes a subject of the report.

When user Yasue selects the sending command button 1204 after selecting the harassment message 1205 to be reported, a harassment report function of the viewer edits a harassment report mail and sends the mail to the client system 105 of the customer support center, based on input and selected report form input information in FIGS. 10 through 12.

Figure 13:
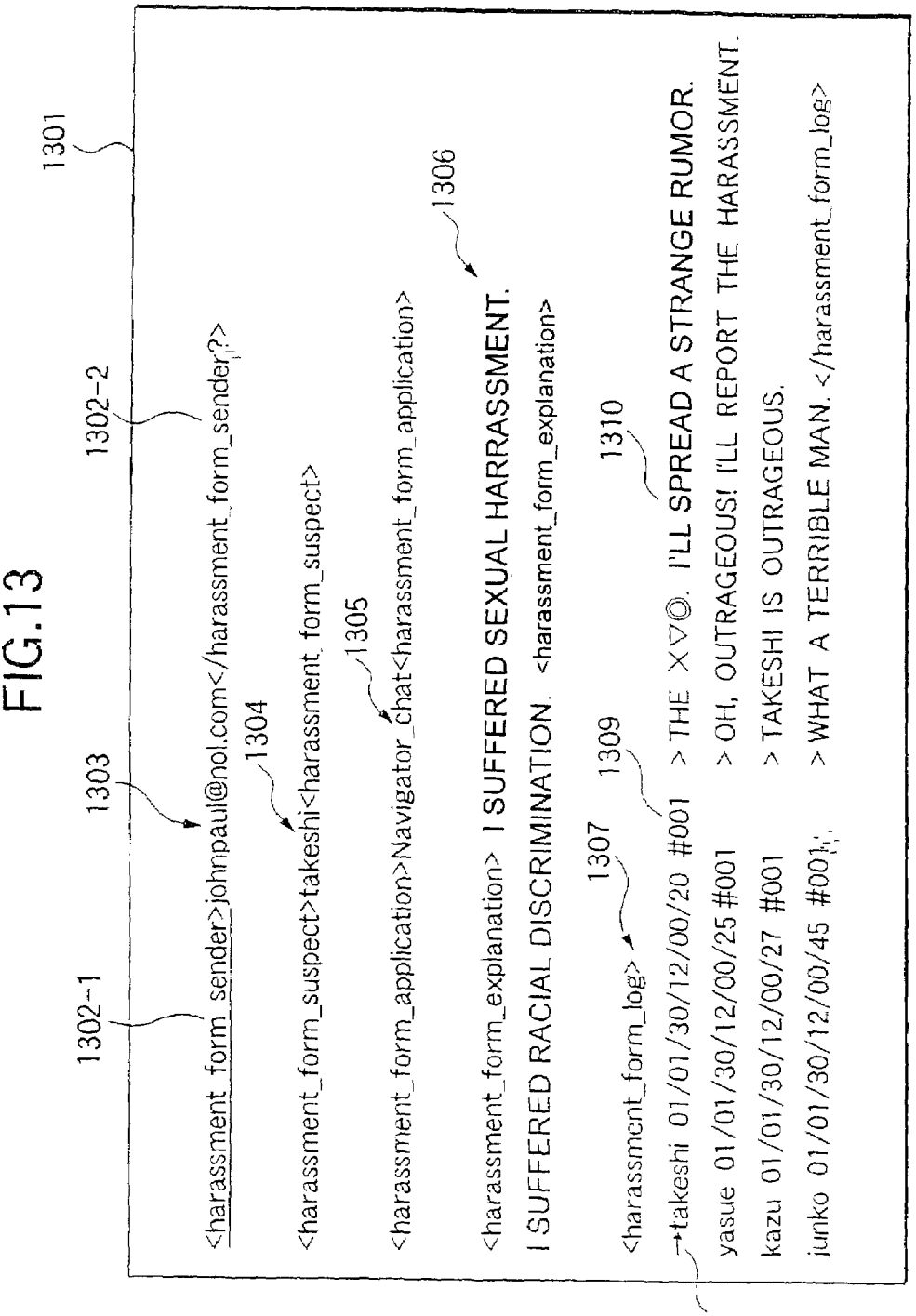
FIG. 13 is an explanatory view of a format of a mail reporting harassment according to an embodiment of the invention.

FIG. 13 shows a format 1301 of the harassment report mail edited and sent in this example. In FIG. 13, the harassment report mail is constituted by information partitioned by labels of "< >".

For example, information surrounded by </harassment_form_sender> label 1302-1 and 1302-2, is reporter mail account information 1303. Similarly, the harassment report mail is constituted by harassment suspect HN information 1304 surrounded by labels </harassment_form_suspect>, application information 1305 surrounded by labels </harassment_form_application> (in this case, chat of navigator), explanation information 1306 surrounded by labels </harassment_form_explanation>, message log information 1307 surrounded by labels </harassment _form_log> and the like.

In the message log information 1307, in front of the harassment message of the object of the report, a "→" symbol 1308 is added. In FIG. 13, the harassment message indicated by the "→" symbol 1308 is constituted by HN "takeshi", the time of recording the message in the log (year/month/day/hour/minute/second) "01/01/30/12/00/20", Room no. "001" 1309 and the message text 1310.

At the client system 105 of the customer support center, the harassment report processing tool always monitors the sent harassment report mail. Furthermore, when the harassment report processing tool receives the harassment report mail, as shown by FIG. 13, the harassment report processing tool downloads and acquires the message log of chat room "001" 1309 from the message server system 102c and searches for the harassment message indicated by the "→" symbol 1308 in the acquired message log using HN "takeshi" and the harassment message indicated by the "→" symbol 1308, time "01/01/30/12/00/20", message text 1310 and the like as search keys.

When the harassment message is determined to be present in the message log of the message server system 102c as a result of the search, the harassment report processing tool determines the reliability of the harassment report mail is good and receives the harassment report mail and stores the harassment report mail in a database. In this case, the harassment report processing tool may be realized as function integrated to well-known mailer and the received harassment report mail may be displayed on the mailer.

(Client System Processing)

An explanation will be given, with reference to FIG. 14 through FIG. 17, of a processing procedure of a client system. As described with reference to FIG. 5 through FIG. 13, when exchanging messages, user Yasue uses the client system 103a and receives the harassment message from Takeshi using the client system 103b and therefore, user Yasue sends the harassment report mail for reporting the harassment to the customer support center. The client system 105 of the customer support center receiving the mail, processes the harassment report.

Figure 14:
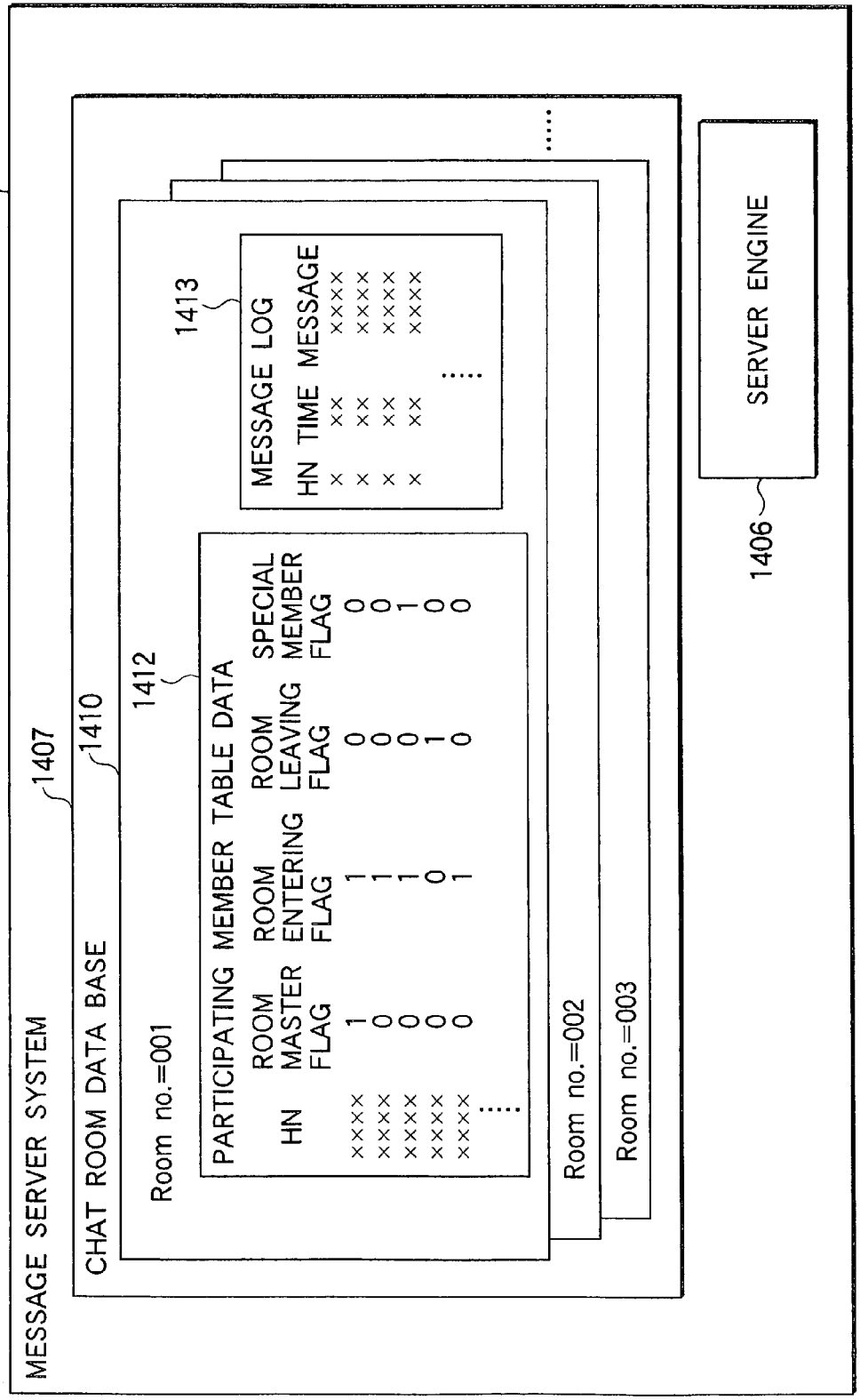
FIG. 14 is an explanatory view of a database of a chat room according to an embodiment of the invention.
Figure 15:
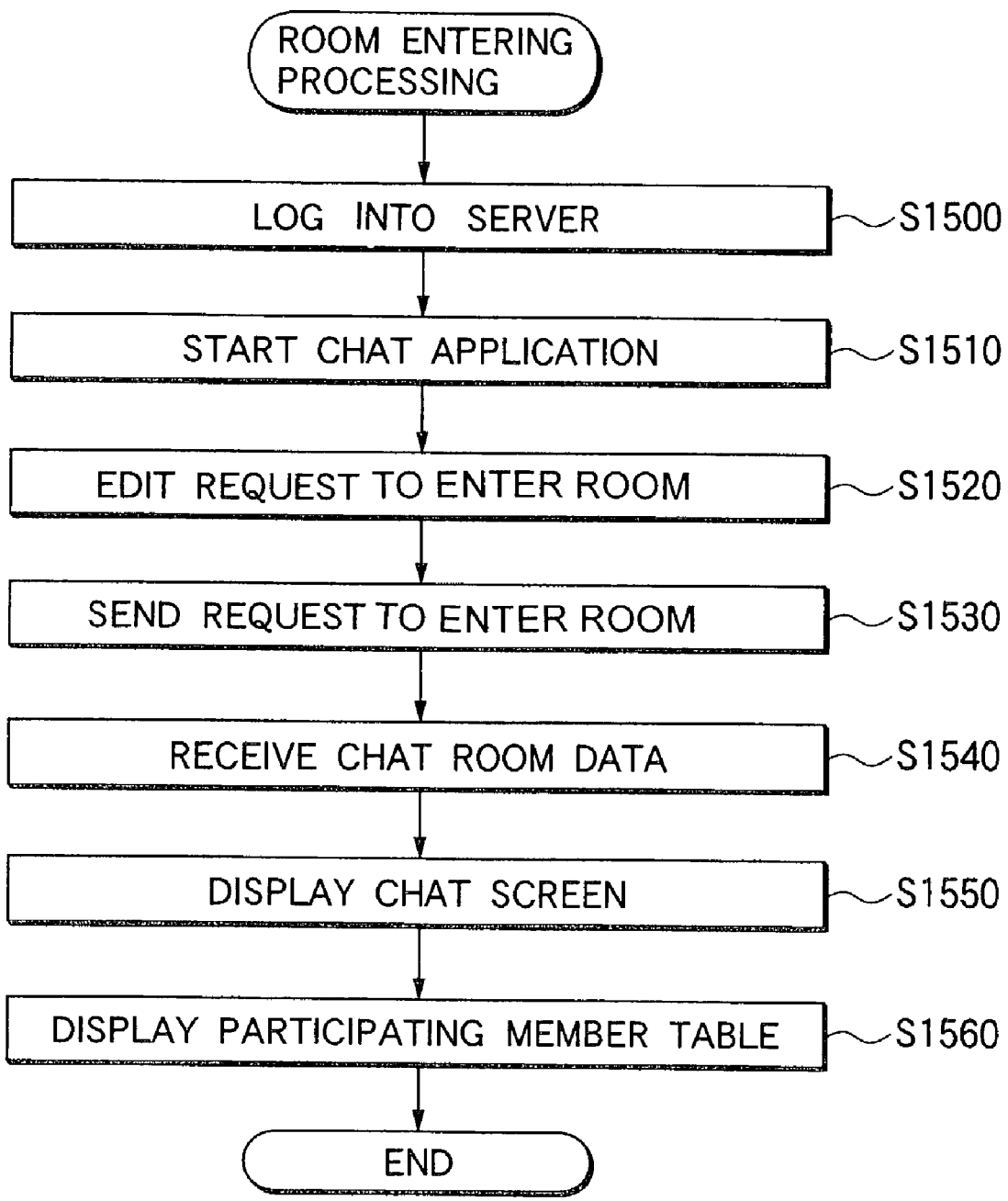
FIG. 15 is a flowchart showing a processing procedure of a viewer program according to an embodiment of the invention.
Figure 16:
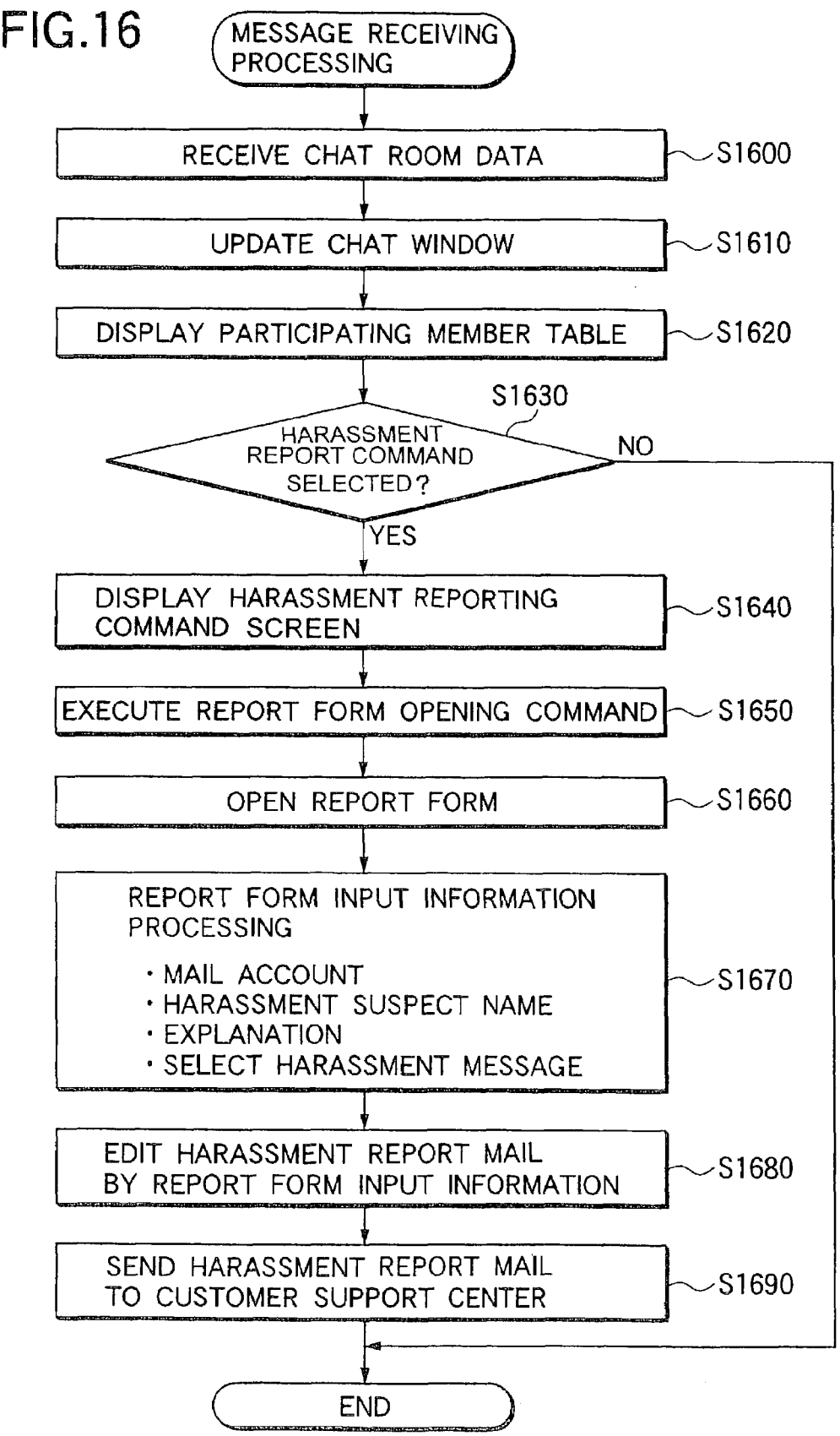
FIG. 16 is a flowchart showing a processing procedure of a viewer program according to an embodiment of the invention.
Figure 17:
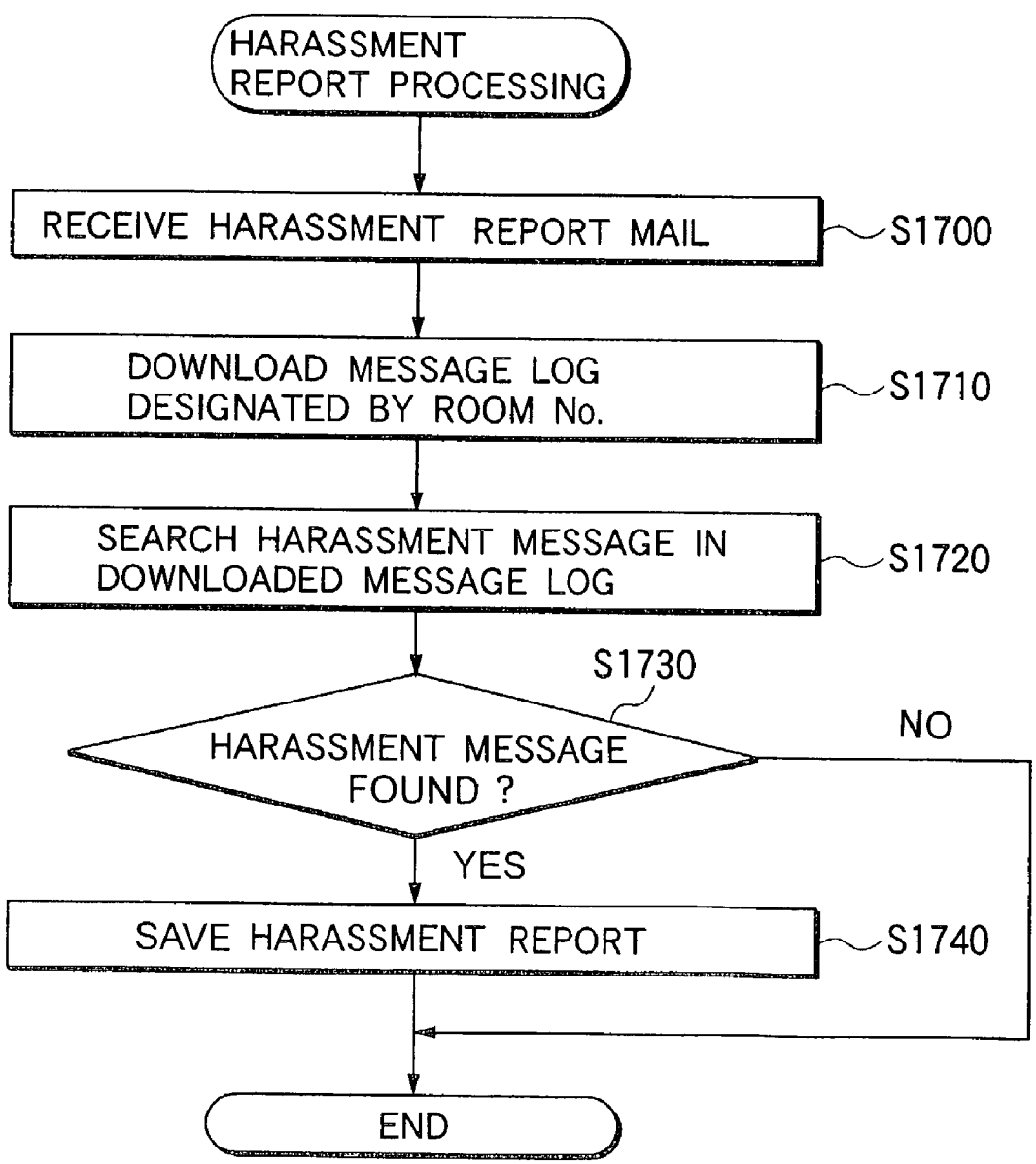
FIG. 17 is a flowchart showing a processing procedure of a report processing tool for harassment according to an embodiment of the invention.

FIG. 14 shows a database of the chat room installed at the message server system 102c. FIGS. 15 and 16 are flowcharts showing processing procedures which the client system uses when exchanging messages and sending the harassment report according to an embodiment. FIG. 17 is a flowchart showing a processing procedure which the client system 105 uses when processing the harassment report, according to an embodiment.

According to an embodiment, the processing procedures shown in FIGS. 15 and 16 are carried out by executing a viewer program loaded from CD-ROM to RAM of the system memory 201b by CPU 201a. Furthermore, at this time, CPU 201a refers to data stored in the memory card inserted into the memory card slot 201f.

Furthermore, according to an embodiment, the processing procedure shown in FIG. 17 is carried out by executing a program of the harassment report processing tool loaded from HD to RAM of the system memory by a CPU provided to the client system 105. By the program of the harassment report processing tool, the CPU of the client system 105 always monitors the sent harassment report mail.

In FIG. 14, the message server system 102c includes a server engine 1406 and a chat room database 1407. The server engine 1406 is a control program of the message server system 102c and carries out control of processing of various requests sent from the respective client systems, database processing and the like.

The chat room database 1407 controls the participating member table data of the chat room and the message log time-sequentially holding messages sent to the chat room and self-controlled messages generated by the system for the respective chat room. Furthermore, the chat room database 1407 stores a chat room list, not illustrated.

For example, data 1410 of the chat room no. 001 includes participating member table data 1412 and message log data 1413. The participating member table data 1412 includes HNs of the members participating in chat room no. 001, status information flags (room entering and leaving status or the like) in correspondence with respective HNs. According to this embodiment, for convenience and for simplicity, the user account of the member participating in the chat room is designated by HN.

In FIG. 15, CPU 201a checks "yasue" and the password of the master account input by a user and a set of the user account and the password in the authentication data stored to the memory card in an initial screen of the viewer. When the master account and the password are verified, logging into the viewer is permitted and the viewer menu screen 501 is displayed on the television receiver 202.

Furthermore, when CPU 201a detects the selecting operation of the navigator command button 503, CPU 201a starts the navigator. Furthermore, the authentication for accessing the server group 102 is confirmed by the user account and the password required for log in of the viewer. When the authentication is obtained and the user is on line with the server group 102, as shown by FIG. 6, CPU 201a displays the main window 602 of the messenger on the viewer and starts the messenger (the step S1500).

When CPU 201a detects selection of the chat command button 603, a chat application is started. Then, the CPU 201a accesses the message server system 102c to acquire the chat room list and displays the chat room selecting screen 701 as shown by FIG. 7 on the television receiver 202 (the step S1510).

Next, when CPU 201a detects the selection of the chat room 704, i.e., Room no. 001, on the chat room selecting screen 701, CPU 201a edits a request to enter the room by adding the sender HN and transmits the request to the message server system 102c (steps S1520 through S1530). In this case, HN "yasue" is added to the request to enter the room as the sender HN.

When CPU 201a sends the request to enter the room to the message server system 102c, the message server system 102c adds HN "yasue" and the status information to participating member table data 1412 of Room no. 001 and adds a self-controlled message, stating that Yasue entered the room, to the message log 1413. Furthermore, CPU 201a multicasts the chat room data including the newest lines of the message log and the participating member table data 1412, to the users present in the participating member table data 1412.

When CPU 201a receives the chat room data, CPU 201a displays the chart screen 801 shown in FIG. 8 on the television receiver 202 and displays the message log of the received chat room data on the chart window 802 (steps S1540 through S1550). Furthermore, CPU 201a displays the participating member table 804 in accordance with the received participating member table data. (step S1560).

When a CPU of the client system 103b used by Takeshi sends the harassing message to Yasue, the message server system 102c adds the harassing message to the message log 1413. Furthermore, the message server system 102c multicasts chat room data including the newest lines of the message log and the participating member table data 1412 to users present in the participating member table data 1412.

Furthermore, as shown in FIG. 14, when the message server system 102c adds a new message to the message log 1413, the message server system 102c adds the HN of a sender of the message and the time recorded to the log in front of the text of the added message to thereby add the record to the message log 1413. Furthermore, the chat room data is also supplemented with information indicating "Room no.=001".

In FIG. 16, when CPU 201a receives the chat room data, CPU 201a stores the chat room data to RAM of the system memory 201b and displays the message log of the received chat room data on the chat window 802 in the chat screen 801, shown in FIG. 8, on which the message log is already displayed to thereby update the chat window 802 (steps S1600 through S1610). Reference numeral 807 in the drawing in FIG. 8 designates the harassing message from Takeshi. Furthermore, CPU 201a displays the participating member table 804 in accordance with the participating member table data of the received chat room data (step S1620).

When CPU 201a detects the selection of the harassment report command button 808, CPU 201a switches display of the television receiver 202 from the chat screen 801 to the harassment report command screen 901 of FIG. 9 (steps S1630 through S1640).

When CPU 201a detects the selection of the report form command button 903, CPU 201a switches from the harassment report command screen 901 to the harassment report form screen 1001 of FIG. 10 (steps S1650 through S1660).

After displaying the harassment report form screen 1001, CPU 201a carries out report form input information processing (step S1670). Items used during report form input information processing, executed at step S1670, are successively "mail account of reporter Yasue" input to the mail account input column 1002 and HN "Takeshi" of the harassment message 807 input to the harassment suspect name input column 1003. Also included are an explanation of the content of the harassing message, which is input to the explanation input window 1102 of FIG. 11, and the harassment message. The harassing message is generated by importing the message log of the chat window 802 into the message log window 1202 and detecting the selection of the harassment message from the harassment message selecting screen 1201 of FIG. 12. At step S1670, CPU 201a stores the report form input information to RAM of the system memory 201b.

Next, when CPU 201a detects the selection of the sending command button 1204 of FIG. 12, CPU 201a edits the harassment report mail based on the report form input information stored to RAM of the system memory 201b. The CPU 201a also calls the mail application function of the viewer and sends the harassment report mail to the client system 105 (steps S1680 through S1690).

Although in the message log displayed on the chat window 802 and imported to the message log window 1202, the HN of the message sender and the time of record are not displayed, in the message log of the chat room data stored to RAM of the system memory 210b the HN of the message sender and the time of record are present. Further, the chat room data includes "Room no.=001" and therefore, the CPU 201a can edit the message log information 1307 of FIG. 13.

Furthermore, when CPU 201a and a CPU provided to a game machine main body of another client system detect selecting of return to a preceding screen or selection of log out during the chat in the chat application, CPU 201a or the CPU of the other client system ends the chat application.

Meanwhile, in FIG. 17, when the CPU of the client system 105 receives the harassment report mail, the CPU analyzes the received mail and extracts the HN "takeshi", the time "01/01/20/12/00/20", the message text 1310 and Room no. "001" 1309 in the harassment message designated by "→" symbols 1308 (step S1700). Furthermore, the CPU of the client system 105 requests the message log data 1413 in the data 1410 of chat room no. "001" from the message server system 102c in accordance with acquired Room no. "001" and downloads the message data 1413 (step S1710).

The CPU of the client system 105 searches for the harassment message designated by the "→" symbol 1308 in the acquired message log 1413 using the HN "takeshi", the time "01/01/30/12/00/20", the message text and the like as search keys (step S1720).

When the CPU of the client system 105 determines that the harassment message designated by the "→" symbol

1308 is present in the message log 1413 of the message server system 102c as a result of the search, the CPU determines that reliability of the harassment report mail is good and saves the harassment report mail to the database. Or, the CPU may deliver and display the received harassment report mail to a well-known mailer (steps S1730 through S1740).

(Effect of Embodiment)

According to an embodiment, the user who receives the harassment message can easily send the complaint as well as the message itself to the customer support center. Furthermore, the customer support center can easily determine the veracity of the complaint.

Furthermore, the customer support center determines whether the received harassment message differs from a record of the message log in the message server system 102c constituting the master data. Therefore, reliability of the harassment message complained about by the user can be confirmed, as well as the fact that the content of message has not been altered when sending the harassment report mail.

(Other Embodiments)

Other embodiments can be also carried out.

1) Although, in the above-mentioned embodiment, the harassment report is processed by the harassment report processing tool started by the client system 105, the harassment report may be processed by starting the harassment report processing tool by a predetermined server system of the business server system 102h or the like.

2) Furthermore, in the above-mentioned embodiment, the message server system 102c and the client system 105 cooperatively detect whether the received harassment message is different from the log constituting the master data, however a single system may have these functions.

3) Although, in the above-mentioned embodiment, the client system is described as a video game machine for household use, the client system may be a PC. In this case, the viewer is not necessarily loaded from CD-ROM but may be preloaded on a hard disk. Furthermore, data for authentication or the like may be stored in a hard disk in place of the memory card. Furthermore, a mouse or a keyboard may be used in place of the controller.

4) Although according to the above-mentioned embodiment, the client system is described as a video game machine for household use, the client system may be a terminal or a game machine installed at a game center. In this case, the viewer is not necessarily loaded from CD-ROM but may be preloaded in a built-in storage device. Furthermore, the data for authentication or the like may be stored in a built-in storage device in place of the memory card. Further, a well known input device corresponding with the controller may arbitrarily be used.

5) Although, in the above-mentioned embodiment, the client system is described as a video game machine for household use, the client system may be a portable information terminal of a portable telephone, PDA (personal digital assistant) or the like. In this case, the viewer may be pre-stored in ROM. Furthermore, data for authentication or the like may be stored in a built-in flash memory in place of the memory card. Furthermore, as an input device corresponding with the controller, an input key or the like may be used.

6) Although, in the above-mentioned embodiment, data for authentication or the like is stored in the memory card, the invention is not limited thereto but data for authentication may be stored in RAM separately provided in the game machine or may be input by the operator.

Although embodiments have been explained for exemplifying the invention, the invention can be modified in ways other than what has been. Modifications are within the technical range of the invention as long as the modifications are based on the spirit of the invention described in the claims.

What is claimed is:

1. A message exchanging system, comprising:
   a server system that distributes message information generated by adding at least sender information to messages being exchanged, and stores a log of the distributed message information;
   a support center client system connected to the server system, the support center client system comprising a receiver that receives a designated message and associated sender information, and a determining system that determines whether the received designated message is present in the log; and
   a plurality of first client systems connected to the server system and executing message exchange via the server system, each first client system comprising a designating system capable of designating one of the messages exchanged between the first client systems as the designated message and associated sender information, and a sending system capable of sending the designated message and the associated sender information to the support center client system.

2. A message confirming system for confirming a message exchanged among a plurality of client systems via a server system, wherein, in exchanging the message, message information generated by adding at least sender information to the message is utilized and the sewer system stores a log of the message information, the message confirming system comprising:
   a receiver that receives, from one of the plurality of client systems, message information comprising one of a plurality of messages that was sent to the one of the plurality of client systems and associated sender information;
   an acquiring system that acquires the message information log from the sewer; and
   a determining system that determines whether the received message information is present in the message information log.

3. The confirming system according to claim 2, further comprising:
   a display that displays the received message and the associated sender information when it is determined by the determining system that the received message information is present in the log.

4. The confirming system according to claim 2, wherein time information is further provided to correspond to the message information; and
   wherein the determining system determines whether the received message information is present in the log by searching for the message information in the log using the sender information and the time information as keys.

5. A server system that distributes message information generated by adding at least sender information to a message being sent among a plurality of client systems connected via a network and stores a log of the message information, the server system comprising:
   a receiver that receives, from one of the plurality of client systems, message information comprising one of a plurality of messages that was sent to the one of the plurality of client systems and associated sender information, the one of a plurality of messages being designated at the one of the plurality of client systems;

a determining system for determining whether the message information received by the receiver is present in the log; and a sending system for sending the one of a plurality of messages to a support center client system.

6. A message exchanging method executed by a message exchange system which comprises a plurality of first client systems, a server system, and a support center client system, which first client systems are connected to the server system and execute a message exchange via the server system, which server system distributes message information generated by adding at least sender information to messages being exchanged and stores a log of the distributed message information, and which support center client system is connected to the server system, the method comprising:

designating, by one of the first client systems, a message exchanged between the first client systems and associated sender information, the message being selected from a plurality of imported messages exchanged between the first client systems;

sending the designated message and the associated sender information to the support center client system;

receiving, by the support center client system, the designated message and the associated sender information sent from the first client system; and determining, by the support center client system, whether the received designated message is present in the log.

7. A message confirming method for confirming whether a message was exchanged among a plurality of client systems via a server system, wherein, in exchanging the message, message information generated by adding at least sender information to the message is utilized and the server system stores a log of the message information, the message confirming method comprising:

receiving, from one of the plurality of client systems, message information selected from the message information distributed to the plurality of client system, the received message information comprising a message that was exchanged among the client systems and designated by the one of the plurality of client systems;

determining whether the received message information is present in the log stored by the server; and sending the received message to a support center client system.

8. The message confirming method according to claim 7, further comprising displaying the received message information and the associated sender information when it is determined that the received message information is present in the log.

9. The message confirming method according to claim 7, further comprising providing time information to correspond to the message information; and the determining further comprising determining whether the received message information is present in the log by searching for the received message information in the log using the sender information and the time information as keys.

10. A message confirming method executed by a server system that distributes message information generated by adding at least sender information to a message sent among a plurality of client systems connected via a network and stores a log of the message information, the message confirming method comprising:

receiving, from a selected one of the plurality of client systems, message information comprising one of a plurality of messages that was sent to the selected one of the plurality of client systems and associated sender information, the one of a plurality of messages being designated at the one of the plurality of client systems;

determining whether the received message information is present in the log; and sending the one of a plurality of messages to a support center client system.

11. A recording medium on which is recorded a program executed by a computer, the program causing the computer to confirm a message exchanged among a plurality of client systems via a server system, wherein, in exchanging the messages, message information generated by adding at least sender information to the messages is utilized and the server system stores a log of the message information, the program comprising:

a receiving procedure that receives, from the plurality of client systems, selected message information comprising one of a plurality of messages that was sent to the plurality of client systems and associated sender information, the one of a plurality of messages being designated at the one of the plurality of client systems;

a determining procedure that determines whether the received message information is present in the log stored by the server system; and a sending procedure that sends the one of a plurality of messages to a support center client system.

* * * * *

UNITED STATES PATENT AND TRADEMARK OFFICE
CERTIFICATE OF CORRECTION

PATENT NO. : 7,203,724 B2  Page 1 of 1
APPLICATION NO. : 10/187375
DATED : April 10, 2007
INVENTOR(S) : Tai Yasue It is certified that error appears in the above-identified patent and that said Letters Patent is hereby corrected as shown below:

At Column 16, line 32 (claim 2 line 5), "the sewer system stores" should be, --the server system stores--.

At Column 16, line 41 (claim 2 line 14), "log from the sewer; and" should be, --log from the server; and--.

At Column 17, line 44 (claim 7 line 15), "log stored by the server; and" should be, --log stored by the server system; and--.

Signed and Sealed this

Third Day of June, 2008

JON W. DUDAS
*Director of the United States Patent and Trademark Office*